United States Patent [19]
Proper et al.

[11] Patent Number: 5,874,034
[45] Date of Patent: Feb. 23, 1999

[54] SWELL REDUCING EXTRUSION DIE

[75] Inventors: James M. Proper, Webster; Anthony T. Burroughs, Rochester; Joseph L. Leonardo, Penfield; Daniel R. Knopp, Williamson; Mark V. Devlin, Marion, all of N.Y.

[73] Assignee: Xerox Corporation, Stamford, Conn.

[21] Appl. No.: 838,891

[22] Filed: Apr. 14, 1997

[51] Int. Cl.⁶ .................................................... B29B 9/06
[52] U.S. Cl. ..................... 264/145; 264/147; 264/176.1; 425/308; 425/461; 425/467
[58] Field of Search ..................... 264/145, 147, 264/176.1; 425/308, 461, 467

[56] References Cited

U.S. PATENT DOCUMENTS

| | | | |
|---|---|---|---|
| 4,859,379 | 8/1989 | Chiang | 264/556 |
| 4,865,796 | 9/1989 | Tamura et al. | 264/40.7 |
| 5,145,762 | 9/1992 | Grushkin | 430/137 |
| 5,234,652 | 8/1993 | Woodhams et al. | 264/210.2 |
| 5,376,494 | 12/1994 | Mahabadi et al. | 528/272 |
| 5,700,413 | 12/1997 | Higuchi et al. | 264/145 |

OTHER PUBLICATIONS

Middleman, Stanley: "Fundamentals of Polymer Processing" McGraw–Hill, 1977, pp. 61–62, 468.

*Primary Examiner*—Leo B. Tentoni

[57] ABSTRACT

The present invention includes a method and apparatus for extruding viscoelastic polymers. Specifically, the invention is directed to an extrusion die for manufacturing viscoelastic and similar polymers while reducing or eliminating die swell. These polymers typically exhibit Deborah numbers that are in the range of 20 to 30 as compared to 1 to 5 of styrene butadiene, as well as high elasticity or elastic modulus. The method and apparatus can be used to manufacture xerographic toner that has a relatively low melting temperature, which can cause a reduction in the power consumption of a printer or copier, and can increase the life of some of the fuser components contained within the machine. More importantly, use of toner particles created using the present invention can reduce or eliminate the phenomenon known as "vinyl off set," which causes the transfer of a hard copy image onto a vinyl material.

21 Claims, 5 Drawing Sheets

SWELL REDUCING EXTRUSION DIE

The present invention is directed to a die used to extrude viscoelastic polymers.

More specifically, the present invention is directed to a die, which allows viscoelastic polymers to be extruded from it while reducing or eliminating the phenomenon known as die swell.

BACKGROUND OF THE INVENTION

The xerographic imaging process begins by charging a photoconductive member to a uniform potential, and then exposing a light image of an original document onto the surface of the photoconductor, either directly or via a digital image driven laser. Exposing the charged photoconductor to light selectively discharges areas of the surface while allowing other areas to remain unchanged, thereby creating an electrostatic latent image of the document on the surface of the photoconductive member. A developer material is then brought into contact with the surface of the photoconductor to transform the latent image into a visible reproduction. The developer typically includes solid particles with an electrical polarity opposite to that of the photoconductive member. A blank copy sheet is brought into contact with the photoreceptor and the toner particles are transferred thereto by electrostatic charging the sheet. The sheet is subsequently heated, thereby permanently affixing the reproduced image to the sheet. This results in a "hard copy" reproduction of the document or image. The photoconductive member is then cleaned to remove any charge and/or residual developing material from its surface to prepare it for subsequent imaging cycles.

The solid used to develop the electrostatic latent image is commonly referred to as toner. Toner is typically a dry, powdery substance, which, as indicated above, has an electrical polarity opposite to that of the latent image. Toner is often manufactured using an extruder with an extruder die present at the end where the toner exits. The main purpose of this die is to shape the molten extrudate into the proper form, which depends upon the cooling mechanism that is in place. The base resin from which the toner is made may have a significant impact on the overall quality of a finished copy. The resin may also have an impact on the life of certain mechanical components of the copier or printing machine in which it is used. Further, the cost of producing toner in a manufacturing facility is related to the type of base resin from which the toner is made. Polyester resins, typically manufactured using a process known in the art as "reactive extrusion" has been proven to have a positive impact on each of the relationships stated above. As an added benefit, polyester resin that has been produced using reactive extrusion can be crosslinked (polymer molecular chains intertwined to form a network) during the extrusion process. Crosslinking provides anchoring points for the polymer molecular chains thereby restraining excessive movement and maintaining the position of the chains within the network. This results in improved material qualities such as added dimensional stability, lowered creep rate, resistance to solvents, and less heat distortion. However, crosslinking of a polyester resin can also produce a viscoelastic polymer with considerable elastic properties. Highly elastic viscoelastic polymers are known to have a relatively high Deborah number, the ratio of the relaxation time of a fluid to an appropriate time scale of deformation. The characteristic of relatively high Deborah number is evident in viscoelastic polymers with high elasticity or high elastic modulus.

In the manufacturing process described above, the molten extrudate from which the xerographic toner is made may expand or "swell" as it exits the die, such that the cross sectional area of the final product will exceed that of the die exit. This expansion of the extrudate as it leaves the die, referred to as "die swell," is a phenomenon, which is experienced to a higher degree in polymers that have considerable elastic properties or relatively high Deborah number. When using a cooling mechanism known as a belt cooler, die swell prevents the extrudate from easily passing through the nip between transport rolls, which move the extrudate onto the belt cooler. Thus, it is advantageous to eliminate or minimize die swell in order to efficiently manufacture high quality xerographic toner when the resin used is highly elastic.

The following disclosures may be relevant to various aspects of the present invention:

U.S. Pat. No. 5,234,652 to Woodhams et al. issued Aug. 10, 1993 discloses a process for the continuous production of high modulus articles from high molecular weight plastics which includes forcing a high molecular weight plastic material through a passage of which the cross-sectional area diminishes in the forward direction of plastic flow, thus producing an extrudate. The plastic material is extruded while it is close to or at its melt temperature, and it is lubricated to obtain substantially plug flow through the passage. The speed at which the plastic material flows through the passage is adjusted to control the elongational velocity gradient at any longitudinal position within the passage, thus producing an extrudate that contains with substantially no fibrillar molecular orientation. The extrudate can be deformed by drawing while it is maintained at or close to its melt temperature, thus producing an oriented, deformed extrudate. The oriented extrudate is then quickly cooled to preserve the orientation.

U.S. Pat. No. 4,859,379 to Chiang issued Aug. 22, 1989 discloses a process for forming film from a melted polymer by extruding the polymer through a slot-die under high a Deborah number condition. The extruded film is then heated while it is in the molten state, to produce a film, which is more uniform in thickness than a film prepared under the same conditions but without heating. The film is cooled, and drawn in the machine direction, thereby reducing draw resonance.

U.S. Pat. No. 4,865,796 to Tamura et al. issued Sep. 12, 1989 discloses a method of producing molding members, which are formed at least partly of a synthetic resin material. A synthetic resin material is extrusion molded into a continuous body with a substantially constant cross-section throughout the entire length thereof. A controlled amount of the material is removed from the predetermined location of the continuous body, synchronously with the extrusion molding of the material, such that the cross-section of the continuous body varies in the longitudinal direction of the body. The continuous body subjected to the controlled removal of the material is then cut into the predetermined length of the molding member.

Middleman, Stanley: "Fundamentals of Polymer Processing" McGraw-Hill, 1977, pg. 61–62, 468 contains a short explanation of the die swell phenomenon as it relates to the behavior of a viscoelastic polymer.

All of the references cited herein are incorporated by reference for their teachings.

Accordingly, although known apparatus and processes are suitable for their intended purposes, a need remains for manufacturing xerographic toner. More specifically, there is a need for processes and apparatus, which allow highly elastic viscoelastic polymers which exhibit relatively high Deborah numbers to be extruded without suffering from die swell. Further, there is a need for processes and apparatus' for manufacturing xerographic toner from materials that have low melting temperatures, which can result in lower power consumption for the printer or copier being used, and an increase in the life of certain fuser components. In addition, a need remains for process and apparatus for producing xerographic toner that reduces or eliminates the phenomenon known as "vinyl off set," which causes the transfer of a hard copy image onto a vinyl material.

SUMMARY OF THE INVENTION

In accordance with the present invention, there is provided a die for extruding polymers with a relatively high Deborah number, which includes: a mold; an inlet to said mold; an exit from said mold; a channel connecting said inlet to said exit, said channel having a length, a depth, and a width, said length and said depth having a ratio; and an insert placed in said channel.

In accordance with another aspect of the invention, there is provided a method of extruding polymers with a relatively high Deborah number, or relatively high elastic modulus including: depositing a polymer fluid into a die, said polymer fluid having an elastic modulus in the range of 1.0E5 to 3.0E5 dynes/cm$^2$ and a Deborah number in the range of 20 to 30, transporting said polymer fluid through said die; transforming said polymer fluid to a relaxed state as it passes through said die; and removing said polymer fluid from said die such that said fluid is evenly spread across an exit of said channel.

The present invention has significant advantages over current dies for extruding viscoelastic and other polymers, which have relatively high Deborah numbers, relatively high elasticity, or relatively high elastic modulus. First, it is capable of successfully extruding such polymers with little or no die swell. In addition, the present invention includes a replaceable die insert. Inserts with wider or narrower heights can be placed in the die in order to produce thinner or thicker extrudate sheets. In addition, heater cartridges can be installed in the die to allow the die to be heated to a temperature greater than the temperature of the extrudate melt. This produces further reduction in die swell if the temperature of the die exceeds that of the extrudate melt by about 100° F. Passage of the material through the die is fast enough so that significant heating of the material by the die does not occur. Also, the present invention can be used to manufacture xerographic toner that has a relatively low melting temperature, which can cause a reduction in the power consumption of a printer or copier, and can increase the life of some of the fuser components contained within the machine. Use of toner particles created using the present invention can also reduce or eliminate the phenomenon known as "vinyl off set," which causes the transfer of a hard copy image onto a vinyl material.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a die, which is used to extrude viscoelastic polymers. Specifically, the present invention is directed to a die for extruding viscoelastic polymers while reducing or eliminating "die swell."

Figure 1:
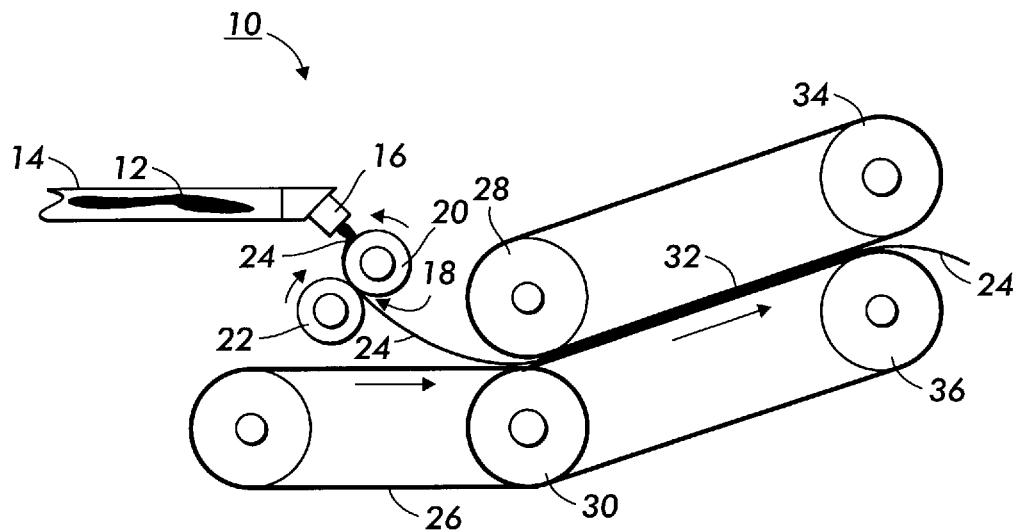
FIG. 1 depicts a schematic of an extruder, nip roll, and belt cooling system presently used to produce xerographic toner.

Referring now to the drawings where the showings are for the purpose of describing an embodiment of the invention and not for limiting same, a description of the process used to produce xerographic toner is first described. As depicted in FIG. 1 extrusion and cooling system 10 is used to transform polymer fluid 12 into a solid, thin, flat extrudate 24 which is subsequently broken into fine dust-like particles that are used to make xerographic toner. Polymer fluid 12 is pushed through extruder 14, and forced through the extruder die 36 into nip 18 between two counter rotating rolls 20 and 22. Water is simultaneously passed through rolls 20 and 22, causing them to be cooled. While passing extrudate 24 through these cooled rolls, causes some cooling of extrudate 24, the most important function of rolls 20 and 22 is to calender the extrudate melt, thereby pressing it into a thin, flat sheet, the thickness of which is dependent upon the distance between rolls 20 and 22. Extrudate 24 is then deposited onto the lower belt 26 of the belt cooler. As extrudate 24 passes between rolls 28 and 30, the upper belt 32 of the belt cooler is brought into contact with it such that it becomes sandwiched between belts 26 and 32, in order to obtain proper and sufficient cooling. Extrudate 24 then passes through rolls 34 and 36 for removal from extrusion system 10, and grinding into fine dust-like particles, which allows it to be treated for use as xerographic toner.

Figure 2:
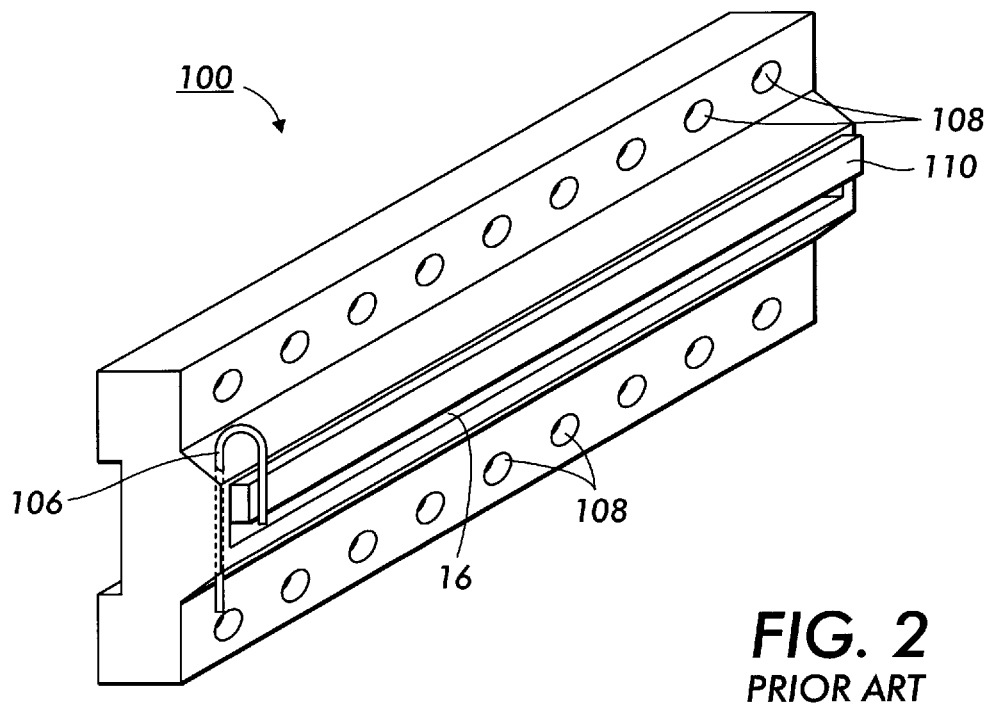
FIG. 2 contains a three-dimensional illustration of an extruder die currently being used in the art.

FIG. 2 contains a detailed three-dimensional view of an extrusion die 100 presently available in the art. A rectangular exit 16 is present at the front face of the die, for removal of extrudate 24 therefrom. As shown, one or more replaceable pins 106 can be placed in exit 16 from which extrudate 24 is removed in order to divide the extrudate material into sections as it passes through exit 16. Dividing extrudate 24 into sections will allow it to stabilize as it enters and passes through nip 18. Holes 108 are located at the top and bottom of the die to mount it to the extruder 14.

Figure 3:
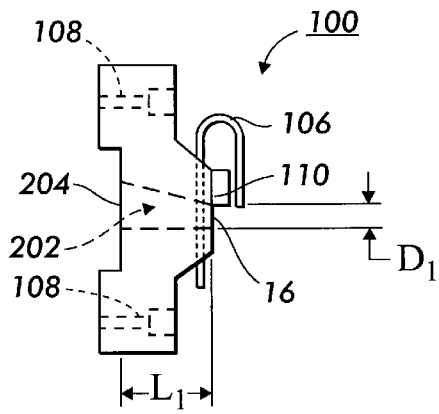
FIG. 3 shows a section view of the extruder die of FIG. 2.

As best illustrated in FIG. 3, extruder die 100 includes a converging channel 202, which has an opening 204 at one end and exit 16 at the other. As shown, the height of opening 204 is substantially larger than that of exit 16. Polymer fluid 12 enters converging channel 202 through opening 204, and is forced through it for removal at exit 16. Extrudate 24 is removed from die 100 through die exit 16, which molds the extrudate to a designated shape and size. The extrudate then passes through nip 18, and is cooled for subsequent use in a process for manufacturing xerographic toner such as the one disclosed in U.S. Pat. No. 4,233,388 to Bergen et al. issued Nov. 11, 1980, the contents of which are entirely incorporated by reference. Extruder die 100 shown in FIGS. 2 and 3 has been quite useful in manufacturing xerographic toner particles, which have inelastic polymer fluids as their base resin.

It is now recognized that the use of a viscoelastic polymer, such as crosslinked polyester made by the reactive extrusion process, as the base resin for the toner has significant benefits. The lower melting temperature of a viscoelastic polymer relative to styrene acrylate like resins offers an advantage when trying to reduce the power consumption of a printer or copier. Also, the ability to use lower temperatures required to fix or fuse toner to a hard copy sheet may increase the life of certain fuser components. In addition, the use of crosslinked polyester as a toner resin reduces or eliminates the phenomenon known as "vinyl off set," which causes the transfer of a hard copy image onto a vinyl material, such as that used in three ring binder covers and loose leaf folders. Crosslinked polyester resins also may micronize faster than other resins, which offers reduced cost of manufacturing toner.

Unfortunately, manufacturing toner particles using crosslinked polyester or other highly elastic polymers is not possible using extruder die 100 described above. If a viscoelastic fluid is extruded from a die into the air without subsequent drawing, the cross sectional area of the extrudate will usually exceed that of the die exit. This results from an elastic stress relaxation phenomenon commonly referred to as "die swell." Briefly, if a viscoelastic polymer fluid with a high elastic modulus is forced to flow into a capillary from a relaxed state, the flow field present in the capillary will give rise to stresses which strain the fluid. Upon exit from the capillary, the viscoelastic polymer fluid will tend to recover to its original relaxed state, causing it to take on a shape with a larger diameter than the capillary, but a shorter length. Thus, die swell is an elastic recovery of the extrudate emerging from a capillary.

Referring again to FIGS. 2 and 3, when attempts are made to manufacture toner from a highly elastic viscoelastic fluid using extruder die 100, extrudate 24 experiences significant die swell as it exits the die. In fact, the extrudate will typically expand to a size approximately equal to that of entrance 204. This is because the molten extrudate is constantly being deformed as it passes through channel 202, and is not confined to a channel of constant height D for a long enough period of time to allow it to relax. Referring back to FIG. 1, this increase in size makes it almost impossible to move extrudate 24 into nip 18 between the two counter rotating rolls 20 and 22. Instead, the swollen extrudate piles up on top of nip 18, and eventually causes extrusion and cooling system 10 to shut down. Thus, manufacture of toner from a highly elastic viscoelastic polymer has been virtually impossible prior to the present invention.

Figure 4:
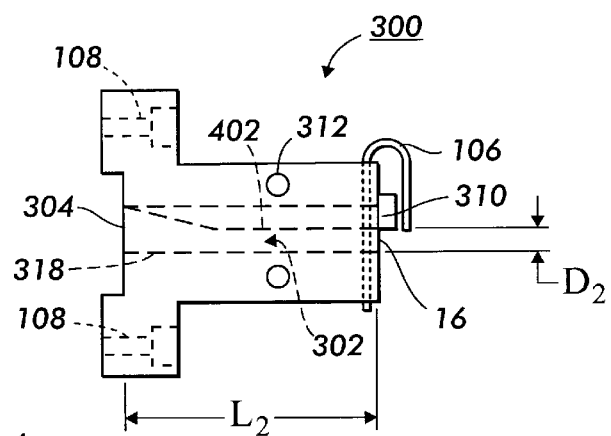
FIG. 4 shows a side view of one embodiment of the extruder die of the present invention.

FIG. 4 depicts a side view of an embodiment of extruder die 300 of the present invention. As best indicated in FIG. 3, holes 108 at the top and bottom of the die are still present to mount the die to the extruder. More importantly the length $L_2$ of extruder die 300 is significantly increased from $L_1$, the comparable dimension shown in FIG. 3 for die 100. Polymer fluid 12 enters channel 302 through opening 304, and is removed from die 300 through exit 16 as extrudate 24. The extended length $L_2$ at a constant height $D_2$ allows the viscoelastic material, which comprises extrudate 24 to relax while it is still in channel 302. More specifically, the ratio of $L_2$ to height $D_2$ of exit 16 in die 300 is larger than the ratio of $L_1$ to $D_1$ for extruder die 100. For example, in one embodiment of the invention, the ratio of L to D may be in the range of 10 to 15. While this range of L/D ratios is known to produce a desired thickness for extrudate 24, smaller and larger values may also produce acceptable results and the invention is not limited to this embodiment. Altering the L/D ratio in the manner described above prevents the extrudate from swelling after it is removed.

Figure 5:
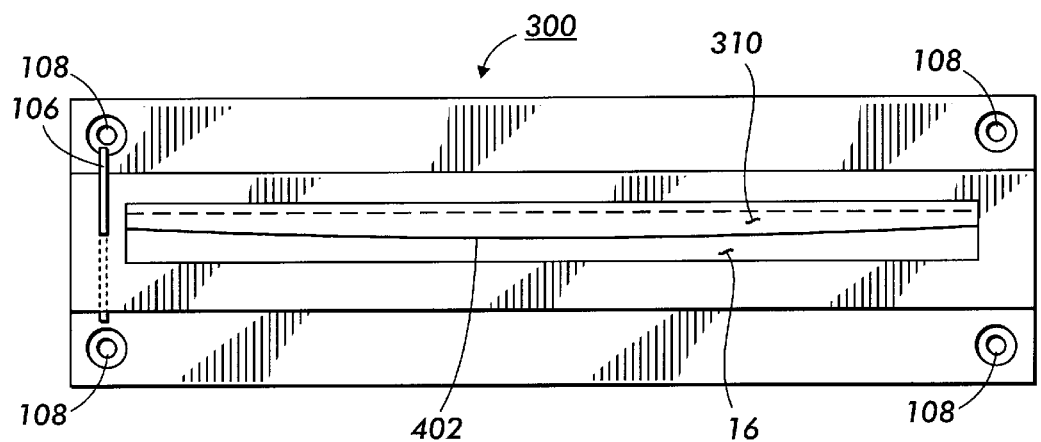
FIG. 5 contains a front view of the extruder die illustrated in FIG. 4.

As shown in FIG. 5, insert 310 is mounted into extruder die 300 causing the upper surface of the die cavity to be convex with respect to the interior of exit 16. The convex upper surface causes the height of cavity 302 to be lower in the middle than at the edges. The unique shape causes higher pressure in the middle of the cavity as fluid is forced to move through it, and results in an even flow distribution out of the exit as extrudate 24 is fanned out toward the edges of die slot 302.

In another embodiment of the invention, one or more pins 106 are placed at the end of slot 16, through the insert, in order to divide the extrudate into several sections as it is removed from extruder die 300 through slot 16. Again, this allows the melt on the nip rolls 20 and 22 to stabilize.

As indicated above, the convex upper surface 402 of exit 16 causes extrudate 24 to be forced out of the die in an even fashion. When upper surface 402 is flat, polymer fluid 12 moves toward the middle of channel 302 as it moves from opening 304 toward exit 16, and causes discontinuous feeding of extrudate 24 to the nip, particularly toward the outer edges. Thus, in die 100 shown in FIGS. 2 and 3, extrudate 24 passes primarily through the center of nip 18 as it exits extruder die 100 through exit 16.

Figure 6:
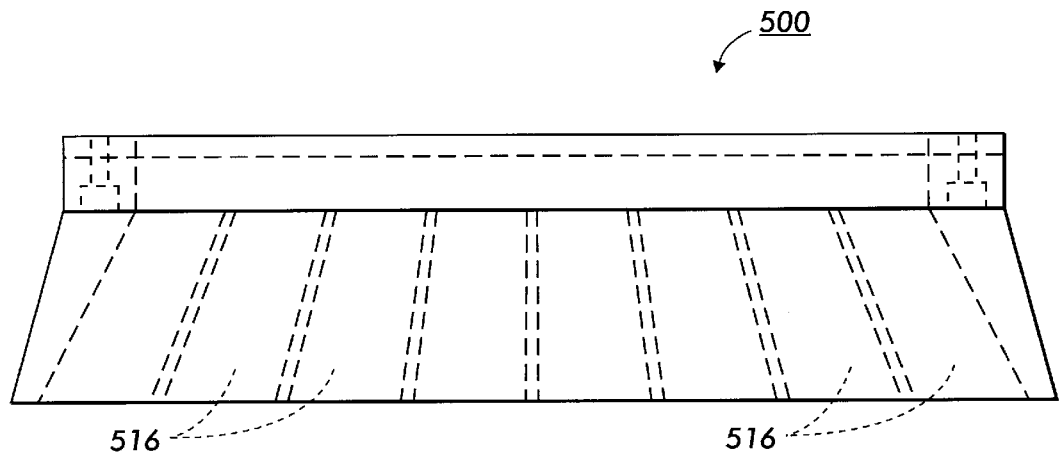
FIG. 6 contains a top view of another embodiment of the extruder die of the present invention.
Figure 7:
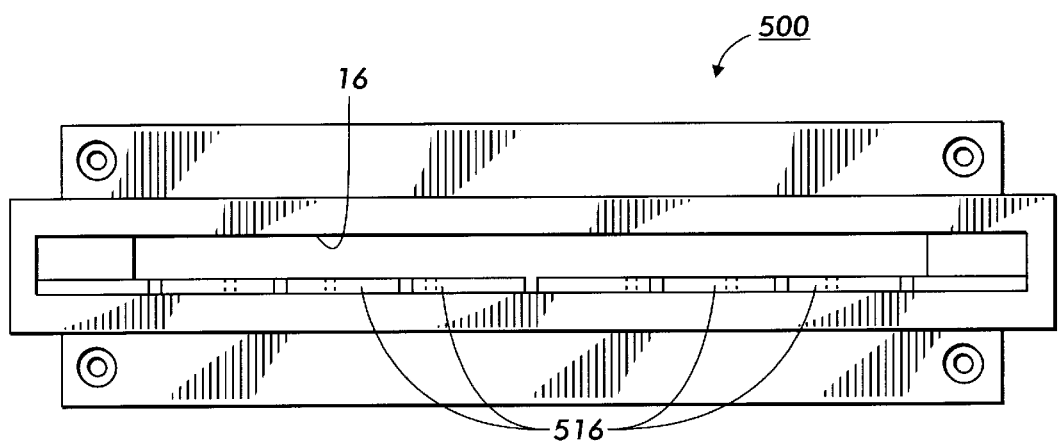
FIG. 7 contains a front view of the embodiment of the extruder die depicted in FIG. 6.

Another embodiment of the invention is depicted in FIG. 6. In this embodiment of extruder die 300 includes insert 500 that has permanent side wall channels 516 which serve to guide the molten extrudate through the die slot and spread the material out on the nip rolls 20 and 22. These channels serve a similar purpose to that of replaceable pins 106 depicted in FIG. 5, in that they divide the extrudate slab into several sections. The presence of channels 516 has been shown to cause extrudate 24 to spread out even further than that exhibited by extruder die 300. A front view of extruder die 300 is illustrated in FIG. 7. Another embodiment of the invention may combine the configurations depicted in FIGS. 5 and 6 to produce an insert that has a convex upper surface and channels for spreading extrudate 24 as it moves toward nip 18.

As stated earlier, the Deborah number of a polymer is defined as the ratio of the relaxation time to some appropriate time scale of deformation. Referring to FIGS. 9 and 10, the relaxation time of crosslinked polyester resin (FIG. 8) and styrene butadiene (FIG. 9) was computed by determining viscoelastic moduli G' and G" at several different frequencies, and then using a transformation function to convert the functions from the frequency domain to the time domain. The relaxation time was then observed by determining where the slope of the curve of G(t) vs. time goes to zero or forms a plateau. The viscoelastic moduli were determined from a Rheometrics instrument, RMS 800 by sinusoidal deformation at 1- % strain.

Figure 8:
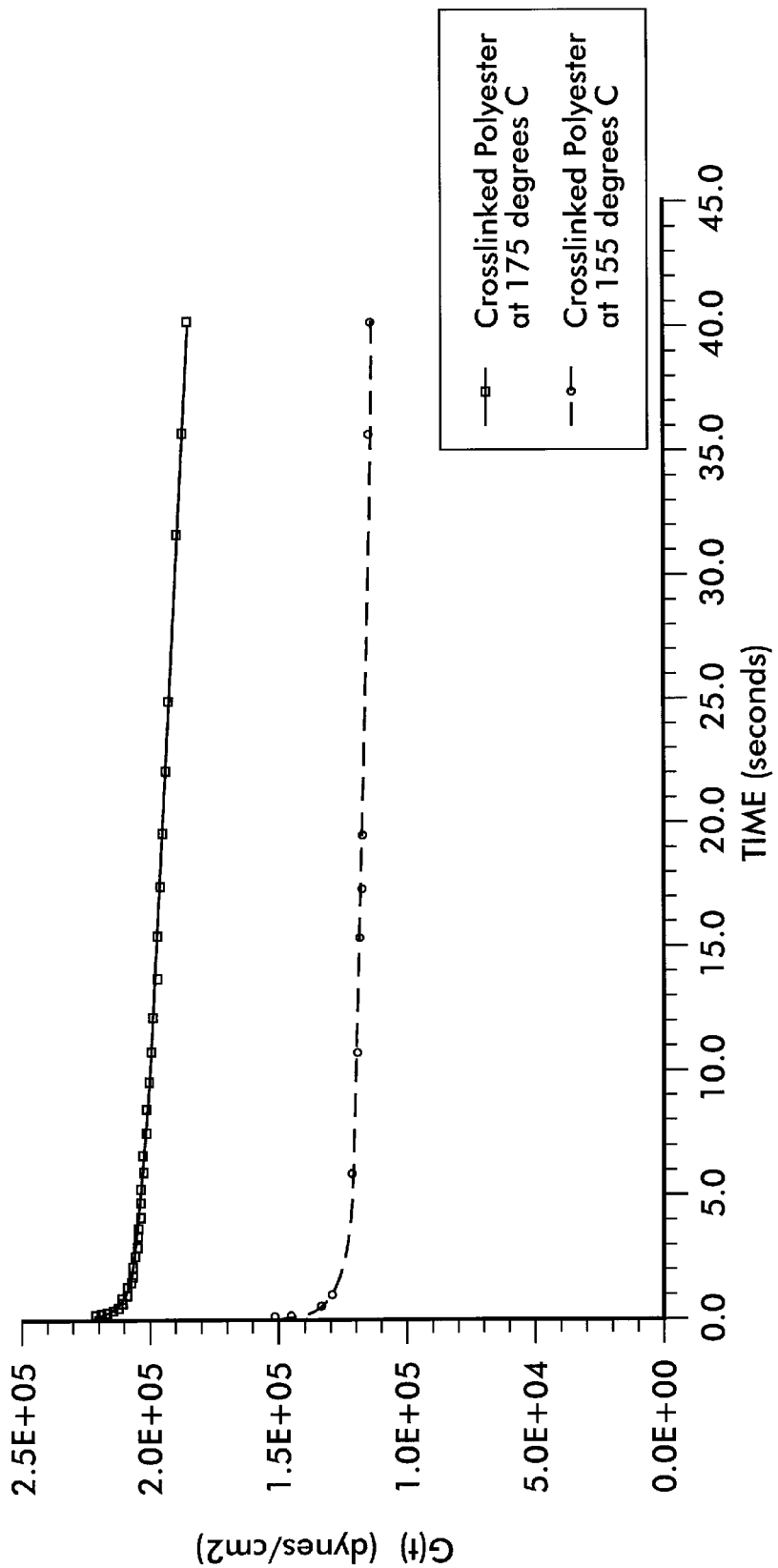
FIG. 8 contains a graphical representation of the relaxation rate vs. time for highly elastic crosslinked polyester.
Figure 9:
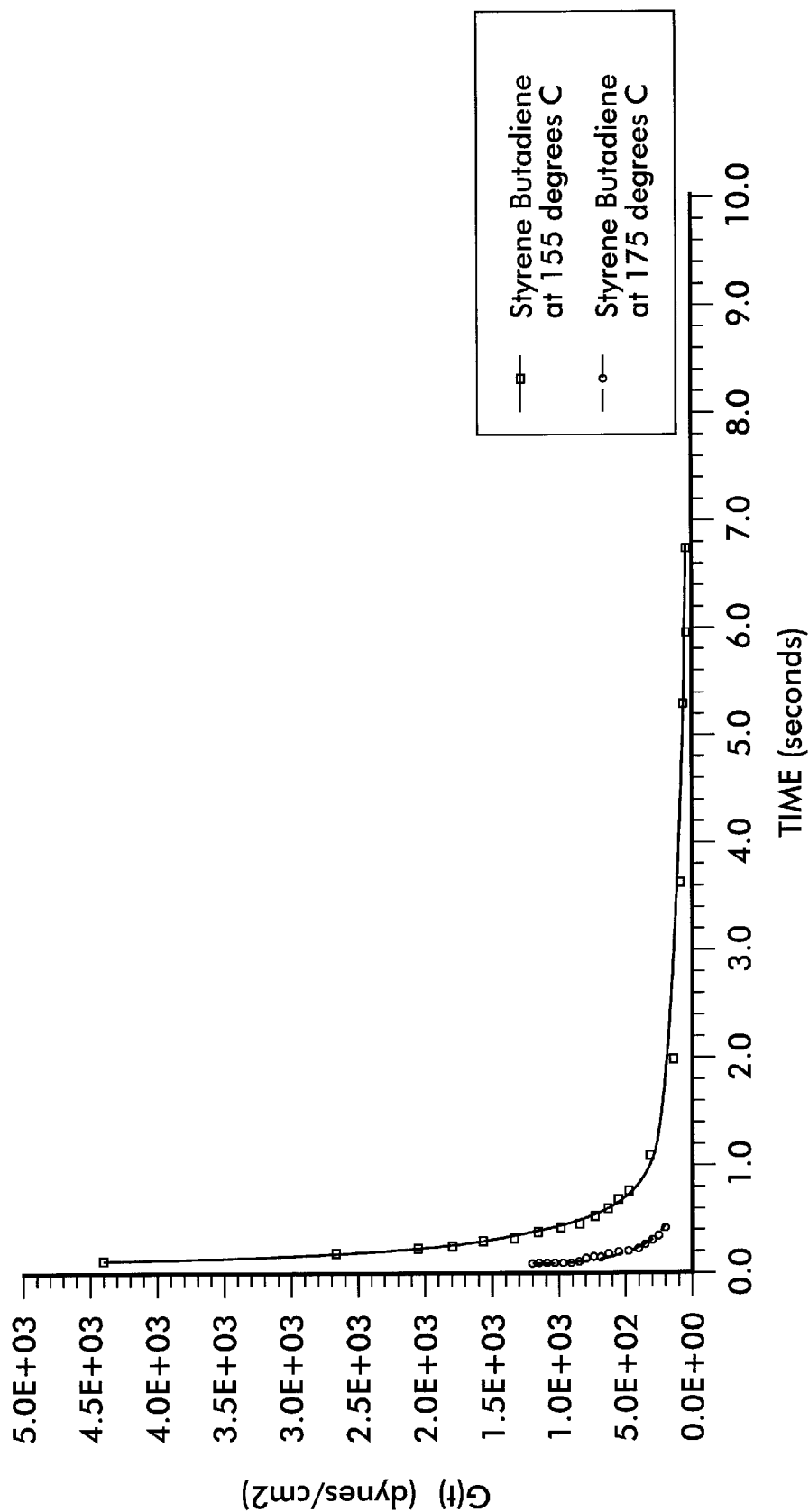
FIG. 9 graphically represents the rate of relaxation for styrene butadiene for reference as a relative comparison with of FIG. 8.

Referring now to FIG. 9, styrene butadiene is an almost purely viscous polymer, and was used as a relative comparison with the highly elastic crosslinked polyester of FIG. 8. Both polymers were measured at 155° and 175° C. In FIG. 8, the function G(t) for crosslinked polyester begins to plateau at about 30 and 25 seconds for temperatures 175° and 155° C. respectively. For the function G(t) representing styrene butadiene, the plateau begins at about 5 and 2 seconds for temperatures 155° and 175° C. respectively. In reviewing both figures, it becomes apparent that the relaxation time is higher for the crosslinked polyester than for styrene butadiene. The appropriate time scale of deformation can be estimated as the residence time of material in the extruder die, which is about 1.1 seconds. Using this time scale the Deborah number range of styrene butadiene is 1.8 to 4.5. The Deborah number range for crosslinked polyester is 27.3 to 22.7, which is relatively high compared to the almost purely viscous fluid styrene butadiene. Another interesting phenomenon that can be noted from FIG. 8 is the fact that the elasticity of the crosslinked polyester increases with increasing temperature.

It is, therefore, apparent that there has been provided in accordance with the present invention, a die for extruding viscoelastic polymers that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A die for extruding viscoelastic polymers, comprising:
   a) a mold;
   b) an inlet to said mold;
   c) an exit from said mold;
   d) a channel connecting said inlet to said exit, said channel having a length, a depth, and a width, said length and said depth having a ratio greater than or approximately equal to 10; and
   e) an insert placed in said channel.

2. A die as claimed in claim 1 wherein channel converges in a direction from said inlet to said exit.

3. A die as claimed in claim 1 wherein said length to depth ratio is sufficient to allow a viscoelastic polymer to be transformed to a relaxed state while in said channel.

4. A die as claimed in claim 1 wherein said length to depth ratio is between 10 and 15.

5. A die as claimed in claim 1 wherein a shape of said insert causes an exiting fluid to spread evenly across said width as it passes through said exit.

6. A die for extruding viscoelastic polymers, comprising:
   a) a mold;
   b) an inlet to said mold;
   c) an exit from said mold;
   d) a channel connecting said inlet to said exit, said channel having a length, a depth, and a width, said length and said depth having a ratio; and
   e) an insert placed in said channel, wherein an interface between said insert and said channel is convex with respect to a lower extremity of said channel.

7. A die as claimed in claim 6 wherein at least one replaceable pin is located in said exit.

8. A die as claimed in claim 6 wherein a plurality of dividers is located along an interior of said channel.

9. A die as claimed in claim 8 wherein said dividers are located along a bottom surface of said channel.

10. A die as claimed in claim 8 wherein heat control cartridges are located in said die such that a relative temperature of said die and a fluid passing through said die is capable of being varied.

11. A method of extruding viscoelastic polymers comprising:
    a) transporting the polymer fluid through said die wherein the polymer has a Deborah number greater than or approximately equal to 20;
    b) transforming the polymer fluid to a relaxed state as it passes through said die; and
    c) removing said polymer fluid from said die such that said fluid is evenly spread across an exit of said channel.

12. A method of extruding polymers as claimed in claim 11 wherein said transforming step further comprises moving said polymer fluid along a channel for a sufficient distance to cause said polymer fluid to relax.

13. A method of extruding polymers as claimed in claim 11 wherein said die further comprises:
    a) a mold;
    b) a channel inside said mold, said channel having a length a width, and a depth;
    c) an inlet to said channel;
    d) an exit from said channel; and
    e) an insert located inside of said channel between said inlet and said exit.

14. A method of extruding polymers as claimed in claim 11 wherein a ratio of said length to said depth is sufficient to allow a viscoelastic polymer to be transformed to a relaxed state prior to exiting said channel.

15. A method of extruding polymers as claimed in claim 11 wherein a ratio of said length to said depth is between 10 and 15.

16. A method of extruding polymers as claimed in claim 11 wherein said channel is configured to cause an exiting fluid to spread evenly as it passes through said exit.

17. A method of extruding polymers as claimed in claim 11 wherein an interface between said insert and said channel is convex with respect to a lower extremity of said channel.

18. A method of extruding polymers as claimed in claim 11 wherein at least one replaceable pin is located in said exit.

19. A method of extruding polymers as claimed in claim 11 wherein heat control cartridges are located in said die to cause a relative temperature of said die and said polymer fluid to be varied.

20. A method of extruding polymers as claimed in claim 11 wherein a plurality of dividers are located along an interior of said channel.

21. A method of extruding polymers as claimed in claim 20 wherein said dividers are located along a bottom surface of said channel.

* * * * *